(12) United States Patent
Held et al.

(10) Patent No.: US 12,265,375 B2
(45) Date of Patent: Apr. 1, 2025

(54) MANUFACTURING OR CONTROLLING A TECHNICAL SYSTEM USING AN OPTIMIZED PARAMETER SET

(71) Applicant: Siemens Aktiengesellschaft, Munich (DE)

(72) Inventors: Harald Held, Bockhorn (DE); Denis Smirnov, Munich (DE); Sanjeev Srivastava, Chantilly, VA (US); Wei Xia, Raritan, NJ (US); Yayun Zhou, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 271 days.

(21) Appl. No.: 17/910,904

(22) PCT Filed: Mar. 3, 2021

(86) PCT No.: PCT/EP2021/055274
§ 371 (c)(1),
(2) Date: Sep. 12, 2022

(87) PCT Pub. No.: WO2021/185579
PCT Pub. Date: Sep. 23, 2021

(65) Prior Publication Data
US 2023/0161325 A1  May 25, 2023

(30) Foreign Application Priority Data
Mar. 19, 2020 (EP) .................................. 20164244

(51) Int. Cl.
*G05B 19/4155* (2006.01)
(52) U.S. Cl.
CPC ............ *G05B 19/4155* (2013.01); *G05B 2219/31368* (2013.01)

(58) Field of Classification Search
None
See application file for complete search history.

(56) References Cited

U.S. PATENT DOCUMENTS

| 2014/0128997 A1 | 5/2014 | Holub et al. |
| 2015/0058270 A1 | 2/2015 | Kawata et al. |
| (Continued) | | |

FOREIGN PATENT DOCUMENTS

| CN | 109964180 A | 7/2019 |
| EP | 3567530 A2 | 11/2010 |
| (Continued) | | |

OTHER PUBLICATIONS

PCT International Search Report and Written Opinion of International Searching Authority mailed Jun. 5, 2021 corresponding to PCT International Application No. PCT/EP2021/055274 filed Mar. 3, 2021.

*Primary Examiner* — Ryan A Jarrett
(74) *Attorney, Agent, or Firm* — Schmeiser, Olsen & Watts LLP

(57) ABSTRACT

A computer-implemented method for manufacturing or controlling a technical system includes the method steps: (a) inputting a sample of parameter sets suitable for manufacturing or controlling the technical system, with a feasibility identifier assigned to each of the parameter sets, wherein the feasibility identifier marks each parameter set either as technically feasible or technically non-feasible or erroneous in terms of manufacturing or controlling the technical system, (b) generating a computerized surrogate model for the technical system based on the respective parameter sets of the sample, which are marked as technically feasible, by means of a regression method, (c) determining an optimized parameter set based on the surrogate model by means of a computerized optimization method, and (d) outputting the (Continued)

optimized parameter set for manufacturing or controlling the technical system.

11 Claims, 3 Drawing Sheets

(56) References Cited

U.S. PATENT DOCUMENTS

| | | |
|---|---|---|
| 2015/0363734 A1* | 12/2015 | Leboucher ......... G06Q 10/0631 |
| | | 705/7.26 |
| 2016/0307115 A1 | 10/2016 | Wu |
| 2017/0107808 A1 | 4/2017 | Forstner et al. |
| 2017/0205809 A1 | 7/2017 | Sayyarrodsari et al. |
| 2017/0336784 A1 | 11/2017 | Koppikar |
| 2018/0189242 A1 | 7/2018 | Fukushima et al. |
| 2019/0347370 A1 | 11/2019 | Matei et al. |
| 2020/0006478 A1 | 2/2020 | Hsu et al. |
| 2021/0278810 A1* | 9/2021 | Heesche ................. G06N 3/08 |
| 2022/0179374 A1* | 6/2022 | Kaberg Johard ....... G06F 30/27 |

FOREIGN PATENT DOCUMENTS

| | | |
|---|---|---|
| EP | 3246769 A1 | 11/2017 |
| JP | 2015062102 A | 4/2015 |
| JP | 2018109876 A | 7/2018 |
| JP | 2018180759 A | 11/2018 |
| JP | 2019138542 A | 8/2019 |
| JP | 2019159675 A | 9/2019 |
| JP | 2021038049 A | 3/2021 |
| WO | 0033146 A1 | 6/2000 |
| WO | 2018222203 A1 | 12/2016 |

* cited by examiner

MANUFACTURING OR CONTROLLING A TECHNICAL SYSTEM USING AN OPTIMIZED PARAMETER SET

CROSS-REFERENCE TO RELATED APPLICATIONS

This application claims priority to PCT Application No. PCT/EP2021/055274, having a filing date of Mar. 3, 2021, which claims priority to EP Application No. 20164244.4, having a filing date of Mar. 19, 2020, the entire contents both of which are hereby incorporated by reference.

FIELD OF TECHNOLOGY

The following relates to a computer-implemented method, an apparatus and a computer program product for generating an optimized parameter set for manufacturing or controlling a technical system.

BACKGROUND

Before manufacturing or controlling a product or a technical system determining suitable production, control and/or construction parameters are required. During e.g. a design phase a computerized optimization method is often used to optimize parameter settings for manufacturing the product or controlling the technical system. Such an optimization procedure is typically run in iterations and can therefore be time and/or resource consuming, as the parameter values obtained from the optimization need to be evaluated. The evaluation is usually performed by using a computerized simulation of the product or technical system, e.g. a finite-element-analysis (FEA) or a computational-fluid dynamics (CFD) simulation. However, a typical optimizer usually has insufficient information about such a computerized model, such that the optimizer can generate parameters which cannot be evaluated and/or do not satisfy system or product constraints, resulting in useless parameter sets.

EP 3 246 769 A1 describes a controller for simulation and optimization of operations of a power plant, wherein a dynamic model of the power plant based on geometrical and operation data is created, and a surrogate model for a specific performance metric based on the dynamic model is generated, which is incorporated into an optimization procedure to optimize operations of the power plant for the specific performance metric.

SUMMARY

An aspect relates to improve a generation of an optimized parameter set for manufacturing or controlling a product or technical system.

Embodiments of the invention provide according to the first aspect a computer-implemented method for manufacturing or controlling a technical system, comprising the method steps:
  (a) inputting a sample of parameter sets suitable for manufacturing or controlling the technical system, with a feasibility identifier assigned to each of the parameter sets, wherein the feasibility identifier marks each parameter set either as technically feasible, if it meets given system criteria of the technical system, or technically non-feasible, if it does not meet the given system criteria, or erroneous, if an evaluation of the parameter set using a computerized simulation results in an error, in terms of manufacturing or controlling the technical system,
  (b) generating a computerized surrogate model for the technical system based on the respective parameter sets of the sample, which are marked as technically feasible, but not on erroneous and not on non-feasible parameter sets, by means of a regression method,
  (c) determining an optimized parameter set based on the surrogate model by means of a computerized optimization method,
  and
  (d) outputting the optimized parameter set for manufacturing or controlling the technical system.

If not indicated differently the terms "calculate", "perform", "computer-implemented", "compute", "determine", "generate", "configure", "reconstruct", and the like, are related to acts and/or processes and/or steps which change and/or generate data, wherein data can particularly be presented as physical data, and which can be performed by a computer or processor. The term "computer" can be interpreted broadly and can be a personal computer, server, mobile computing device, or a processor such as a central processing unit (CPU) or microprocessor.

An important advantage of embodiments of the present invention is the usage of a surrogate model representing and/or approximating at least part of the technical system. The surrogate model is a computerized model. In an embodiment, the surrogate model is less complex than a detailed computerized simulation model of the technical system, such as a CFD simulation model. The surrogate model can for example be stored in a data structure. It is generated by means of a regression method and is generated depending on the input sample of parameter sets for manufacturing or controlling the technical system. The surrogate model is generated based on at least one technically feasible parameter set and corresponding evaluation results of this parameter set.

A parameter set comprises parameter values defining at least a property or a functionality of the technical system. A parameter set can be understood as a data set. A parameter set can for example comprise construction, production, control, operation and/or design parameters. A construction parameter set comprises for example parameters which can specify a size, a weight, a material, etc. of at least a component of the technical system. Furthermore, a construction or control parameter set can comprise system or product-specific setting parameters for a manufacturing unit or machine. A control parameter set can for example comprise system-specific control parameters for setting a control unit of the technical system for controlling the technical system.

A parameter set can for example serve as input for a manufacturing unit wherein the manufacturing unit is configured to manufacture the technical system depending on the respective construction parameter set. The sample of parameter sets is hence a plurality of parameter sets wherein each parameter set is suitable for manufacturing the technical system. Each parameter set is labeled with a feasibility identifier allowing to identify a more suitable parameter set.

An optimized parameter set is determined based on the surrogate model, accelerating the optimization process. As the surrogate model is generated based on feasible, but not on erroneous and also not on non-feasible, parameter sets. The optimization is then run on a pre-constrained model. In other words, the optimization procedure for determining the optimized parameter set takes information about e.g. system constraints of the technical system into account. Therefore, a more suitable optimized parameter set for manufacturing or controlling the technical system can be generated. The parameter optimization is therefore accelerated compared to standard methods.

According to an embodiment of the computer-implemented method, a feasibility identifier of the optimized parameter set can be determined by means of a computerized evaluation method.

The computerized evaluation method can for example be trained based on a machine learning method, such that it reproduces a feasibility identifier distribution of a training data set, wherein the training data set comprises parameter sets which are labeled with respective feasibility identifiers. The computerized evaluation method is for example an artificial neural network or the like. Using such a computerized evaluation method, information embedded in the data, i.e. in a parameter set, can be used to identify whether the parameter set is feasible, non-feasible or erroneous.

For example, the outputted optimized parameter set can be evaluated by means of such a trained computerized evaluation method to determine whether it is technically feasible or technically non-feasible or erroneous in terms of manufacturing or controlling the technical system.

According to a further embodiment of the computer-implemented method, the optimized parameter set can be determined by means of the computerized optimization method and depending on its feasibility identifier.

The value of the respective feasibility identifier, i.e. technically feasible or technically non-feasible or erroneous, of an outputted optimized parameter set can further be evaluated by the optimization method as an additional optimization constraint. With such an additional information, the optimization method allows to generate a parameter set avoiding particularly erroneous parameter combinations and/or unnecessary computational iterations.

According to a further embodiment of the computer-implemented method, the optimized parameter set can be added to the sample of parameter sets.

By adding the outputted optimized parameter set to the sample of parameter sets an optimized surrogate model can be generated, further improving the generation of an optimized parameter set.

According to a further embodiment of the computer-implemented method, the inputted sample of parameter sets can be generated and outputted by means of a second computerized optimization method which is configured to determine at least one parameter set suitable for manufacturing or controlling the technical system.

The input sample of parameter sets is generated by means of a second computerized optimization method and evaluated using a computerized simulation model of the technical system in order to determine the technical feasibility of each parameter set. The second computerized optimization method can for example be the same as the aforementioned optimization method.

According to a further embodiment of the computer-implemented method the regression method can be an incremental local Gaussian regression method.

For generating the surrogate model an incremental local gaussian regression algorithm (ILGR) can be adopted to train the model. This algorithm combines the advantage of locally weighted regression (LWR) and Gaussian Process Regression (GPR). It uses localizing function basis and approximates inference techniques to build a Gaussian process regression algorithm of increasingly local nature and similar computational complexity to LWR. It allows for example streaming datasets of unknown size, such that it is especially suitable to generate a surrogate model during an iterative optimization process. The model generation can be done incrementally while new parameter sets are available.

According to a further embodiment of the computer-implemented method, the technical system can be manufactured or controlled using the outputted optimized parameter set.

The outputted optimized parameter set can for example be transferred to a manufacturing unit or machine for manufacturing the technical system according to this construction parameter set. Alternatively, the outputted optimized parameter set can be transferred to a control unit for controlling the technical system.

Embodiments of the invention provide according to the second aspect an apparatus for manufacturing or controlling a technical system, comprising:

(a) an input unit configured to input a sample of parameter sets suitable for manufacturing or controlling the technical system, with a feasibility identifier assigned to each of the parameter sets, wherein the feasibility identifier marks each parameter set either as technically feasible, if it meets given system criteria of the technical system, or technically non-feasible, if it does not meet the given system criteria, or erroneous, if an evaluation of the parameter set using a computerized simulation results in an error, in terms manufacturing or controlling the technical system, (b) a generator configured to generate a computerized surrogate model for the technical system based on the parameter sets, which are marked as technically feasible, but not on erroneous and not on non-feasible parameter sets, by means of a regression method, (c) an optimizer configured to determine an optimized parameter set based on the generated surrogate model by means of a computerized optimization method, and (d) an output unit configured to output the optimized parameter set for manufacturing or controlling the technical system.

The apparatus and/or at least one of its units can further comprise at least one processor or computer to perform the method steps according to embodiments of the invention. A respective unit may be implemented in hardware and/or in software. If said unit is implemented in hardware, it may be embodied as a device, e.g. as a computer or as a processor or as a part of a system. If said unit is implemented in software it may be embodied as a computer program product (non-transitory computer readable storage medium having instructions, which when executed by a processor, perform actions), as a function, as a routine, as a program code or as an executable object. The output unit provides a data structure comprising the optimized parameter set. Such data structure can for example be transferred to a manufacturing unit or a control unit.

The apparatus can further comprise a manufacturing unit configured to manufacture the technical system using the outputted optimized parameter set. Alternatively, the apparatus can be connected to a manufacturing unit, e.g. via a network.

The apparatus can further comprise a control unit configured to control the technical system using the outputted optimized parameter set. Alternatively, the apparatus can be connected to a control unit, e.g. via a network.

Embodiments of the invention further comprise a computer program product directly loadable into the internal memory of a digital computer, comprising software code portions for performing the steps of the said method when said product is run on a computer.

A computer program product, such as a computer program means, may be embodied as a memory card, USB stick, CD-ROM, DVD or as a file which may be downloaded from a server in a network.

BRIEF DESCRIPTION

Some of the embodiments will be described in detail, with reference to the following figures, wherein like designations denote like members, wherein.

DETAILED DESCRIPTION

Equivalent parts in the different figures are labeled with the same reference signs.

Figure 1:
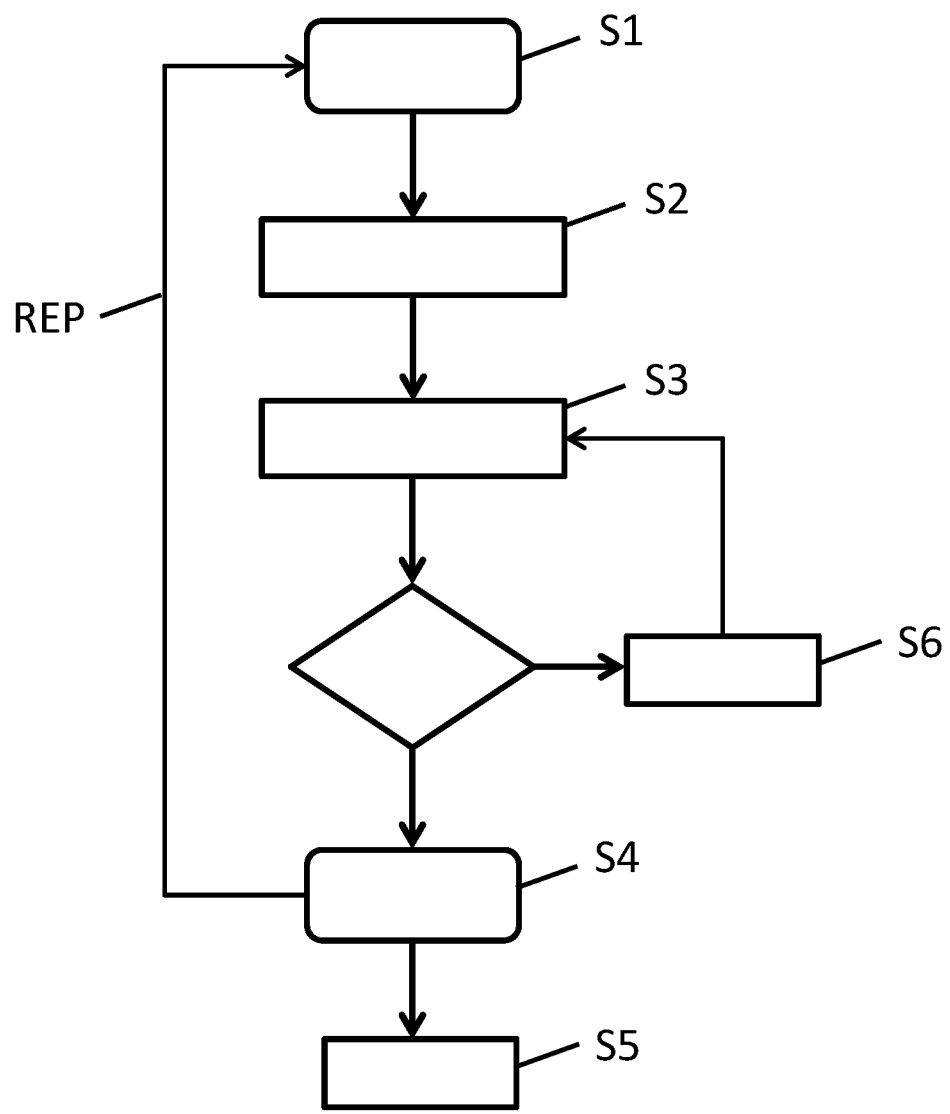
FIG. 1 shows a flow chart including method steps involved in an embodiment of the method for manufacturing or controlling a technical system.

FIG. 1 shows a flow chart illustrating the method steps of a computer-implemented method according to embodiments of the invention for manufacturing or controlling a technical system using an optimized parameter set. The technical system can for example be a machine, like a turbine or motor, a hardware component of a machine, a mechanical part, a product, or similar. Furthermore, the technical system can be a complex system comprising multiple individual parts, e.g., a transportation network for water, oil, packages or the like.

In the first step S1 a sample of parameter sets suitable for manufacturing or controlling the technical system is inputted. Depending of the respective application, i.e. for example either manufacturing or controlling the technical system, the parameter sets comprise construction or production parameters or control parameters.

Each parameter set is labeled with a feasibility identifier marking it either as technically feasible or technically non-feasible or erroneous in terms of manufacturing or controlling the technical system. The respective feasibility identifier can for example be determined by means of a classification or evaluation method and/or by means of an analysis method evaluating the respective parameter set e.g. using a computerized simulation of the technical system.

A parameter set is for example labeled as technically feasible if it meets given system criteria of the technical system. A parameter set is for example labeled as technically non-feasible if it does not meet the given system criteria. A parameter set is for example labeled as erroneous if for example an evaluation of the parameter set using a computerized simulation results in an error. Hence, whether a parameter set is considered as technically feasible is determined by the formed optimization problem. If the parameter set violates one of the constraints, it is not feasible. If the parameter set fulfills all constraints, it is marked as feasible. The differentiation between feasible or infeasible is the error case. While the former is determined by the optimization already, the latter is a result of faulty evaluations, e.g. error from the evaluating software tool.

In the next step S2, a computerized surrogate model for the technical system is generated by means of a regression method. In an embodiment, an incremental local Gaussian regression method is used, which is adopted to train the surrogate model. A respective parameter set defines a functionality or property of the technical system, such as size, mass, width, height, etc. The computerized surrogate model is configured to represent and/or approximate the technical system. Therefore, the surrogate model can be generated based on the input parameter sets which are technically feasible and/or technically non-feasible. In an embodiment, only the technically feasible parameter sets are used for the surrogate model generation. In other words, for the surrogate model generation only part of the sample of parameters, only the technically feasible, is used.

In the next step S3, a computerized optimization method is used to determine an optimized parameter set based on the generated computerized surrogate model. A black-box-optimizer can be used. As only evaluation for the objective and constraints for the variable values, i.e. the respective parameter set, are available, a black-box optimizer can be used to propose variable values and to evaluate these.

The optimized parameter set is outputted, step S4, for manufacturing or controlling the technical system. The optimized construction parameter set can for example serve as an input for a manufacturing machine for manufacturing the technical system or as input for a production unit for producing a product.

Alternatively, a feasibility identifier of the optimized parameter set is determined by means of a computerized evaluation method, step S6. The computerized evaluation method has been trained to determine whether an inputted parameter set is technically feasible, technically non-feasible or erroneous in terms of manufacturing or controlling the technical system. Therefore, the computerized evaluation method is trained or configured to represent the feasibility identifier distribution of the initial input sample of parameter sets. The value of the feasibility identifier of the optimized parameter set can further be used during optimization, step S3, as a further optimization constraint. Therefore, the optimization method can be adopted to additionally evaluate the respective feasibility identifier when determining an optimized parameter set. In an embodiment, an optimized parameter set which is evaluated as erroneous is sorted out.

Furthermore, the outputted optimized parameter set, which is evaluated as technically feasible, can be added to the initial input sample of parameter sets and the method steps S1 to S4 can be repeated, see arrow REP. Such an iteration provides an improved optimized parameter set, which can be outputted for manufacturing or controlling the technical system.

Figure 2:
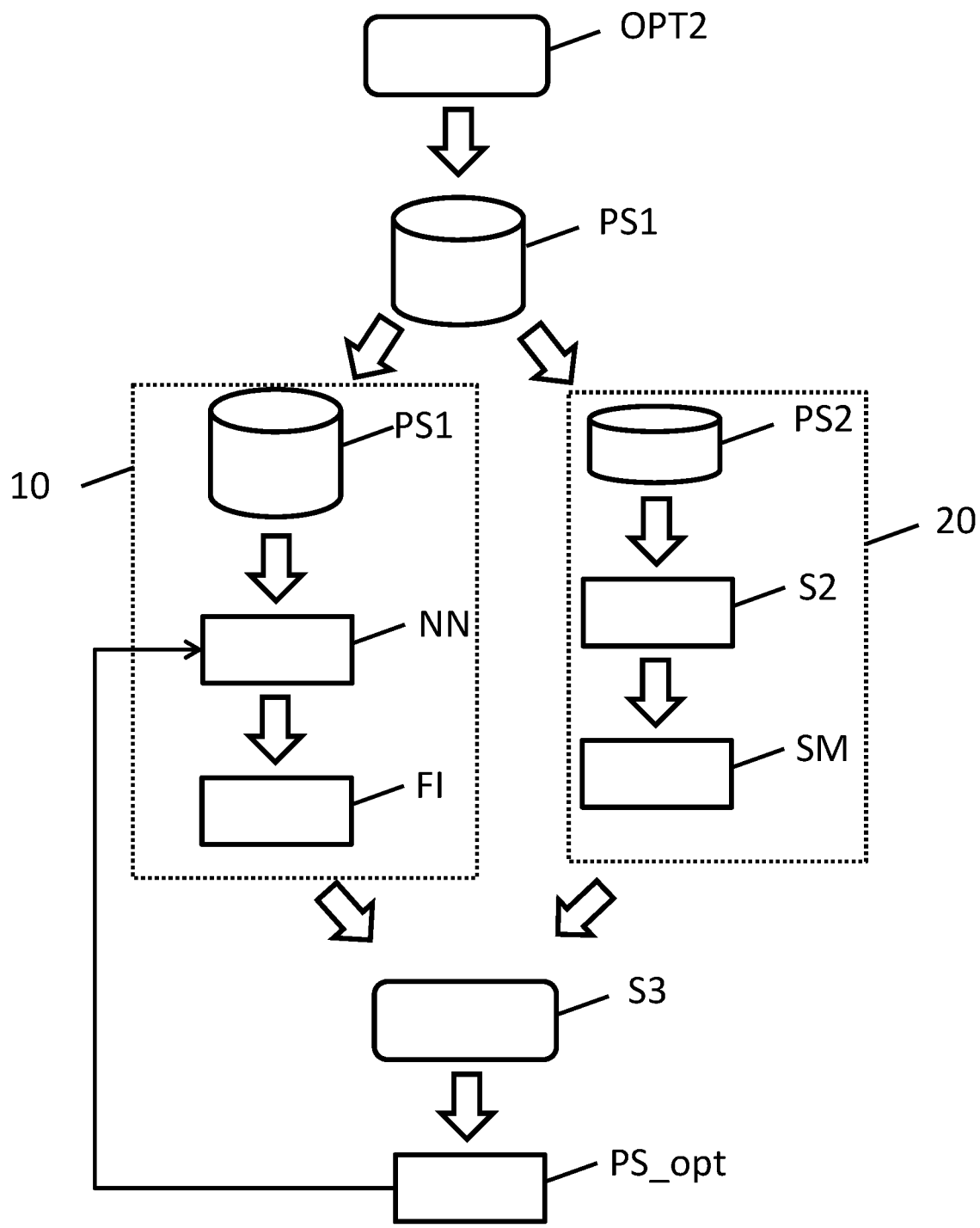
FIG. 2 shows a schematic representation of an embodiment of the method for manufacturing or controlling a technical system.

FIG. 2 shows a schematic representation of an embodiment of the invention. The computer-implemented method for manufacturing or controlling a technical system using an optimized parameter set can comprise two method parts 10, 20.

The initial input data set, i.e., the sample of parameter sets PS1, can for example be provided by an optimization method OPT2. Such optimization method OPT2 can for example generate a sample of parameter sets PS1 for manufacturing the technical system. A feasibility identifier is assigned to each of the sample of parameter sets PS1, marking each parameter set either as technically feasible, technically non-feasible or erroneous. The respective feasibility identifier can for example be determined using a simulation-based evaluation. In other words, the parameter sets PS1 can be understood as labelled data sets.

This sample of parameter sets PS1 can for example be used as a training data set in order to train a computerized evaluation method NN, e.g. an artificial neural network. The computerized evaluation method NN is trained such that it reproduces the feasibility identifier distribution of the training data set. The method part 10 of the illustrated method represents this data classification.

The labeled data set can for example be divided into the training data set and a test data set, such that the computerized evaluation method NN can be trained with the training data set and verified with the test data set. In an embodiment, all parameter sets are used, i.e. the technically feasible, technically non-feasible or erroneous parameter sets. The trained evaluation method NN can then be used to determine a feasibility identifier FI of an outputted parameter set.

Furthermore, the result of the computerized evaluation method NN can be used as an additional constraint for the optimization method, step S3, to determine an optimized parameter set. Such constraint can provide feedback to the optimization method and guides the optimization problem to generate an optimized parameter set according to the feasibility identifier FI, i.e. a parameter set without an error.

The method part 20 comprises the surrogate model SM generation for objective and constraints and the parameter optimization based on the surrogate model. Using only part of the initial sample of parameter sets PS2, comprising only the parameter sets classified as technically feasible, a surrogate model SM for the technical system is generated by means of a regression method, step S2.

The generation of the surrogate model SM comprises the following steps. The first major step is the training process. Here an incremental local gaussian regression algorithm (ILGR) is adopted to train the surrogate model SM combining the advantage of locally weighted regression (LWR) and Gaussian Process Regression (GPR). The second step is the cross validation of the generated surrogate model. The generated surrogate model SM is validated by a validation set, e.g. one part of the partial sample of parameter sets PS2. The root-mean-square-error (RMSE) and R-squared values are evaluated with the validation set and the number of sub-models of the ILGR—also called local models—are inputs of the third step: hyperparameter optimization. These three terms form an objective function and an optimization problem is solved by a black box optimizer, such as BOBYQA from the NLopt library. Then the surrogate model generation process is restarted using the updated hyperparameters, until a stop criterion is satisfied. Therefore, the hyperparameters for ILGR are determined by minimizing the RMSE and the number of sub-models, and maximizing $R^2$.

Part 10 and part 20 can be two independent approaches to accelerate optimization. They can be applied together or separately.

Based on the surrogate model SM, an optimized parameter set PS_opt can be determined by means of an optimization method, step S3. By means of the optimization method, parameters of the surrogate model SM are modified in order to find an optimum. In case of manufacturing, the optimization method can for example determine an optimized parameter set for a product, yielding an optimized size, weight or other physical property of the product. In other words, the optimization method can determine optimized parameters of the surrogate model with respect to a given optimization goal.

If method part 10 is applied, a parameter set can be evaluated based on the computerized evaluation method NN resulting in a feasibility identifier FI. If only part 20 is applied, the optimization method in step S3 will evaluate the surrogate model. If both parts 10, 20 are applied, the optimization method in step S3 includes the additional constraint depending on the feasibility identifier FI and evaluates the generated surrogate model SM. Taking this additional constraint into account, an optimized parameter set PS_opt is determined.

Figure 3:
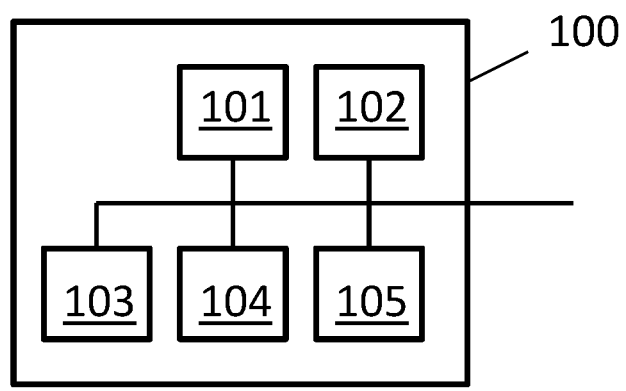
FIG. 3 shows a schematic representation of an embodiment of an apparatus for manufacturing or controlling a technical system.

FIG. 3 shows a schematic representation of an embodiment of an apparatus for manufacturing or controlling a technical system. The apparatus 100 for manufacturing or controlling a technical system comprises an input unit 101, a generator 102, an optimizer 103 and an output unit 104. The apparatus and/or at least one of its units can further comprise at least one processor or computer to perform the method steps according to embodiments of the invention.

The input unit 101 is configured to input a sample of parameter sets suitable for manufacturing or controlling the technical system, with a feasibility identifier assigned to each of the parameter sets, wherein the feasibility identifier marks each parameter set either as technically feasible or technically non-feasible or erroneous in terms manufacturing or controlling the technical system.

The generator 102 is configured to generate a computerized surrogate model for the technical system based on the parameter sets, which are marked as technically feasible, by means of a regression method.

The optimizer 103 is configured to determine an optimized parameter set based on the generated surrogate model by means of a computerized optimization method.

The output unit 104 is configured to output the optimized parameter set for manufacturing or controlling the technical system.

The apparatus comprises an evaluation unit 105 which is configured to determine a feasibility identifier of an inputted parameter set by means of a computerized evaluation method, such as an artificial neural network or a random forest algorithm.

The apparatus further comprises a manufacturing unit (not shown) or is coupled with a manufacturing unit, wherein the manufacturing unit is configured to manufacture the technical system using the outputted optimized parameter set. In addition or alternatively the apparatus can comprise a control unit (not shown) or is coupled with a control unit, wherein the control unit is configured to control the technical system using the outputted optimized parameter set.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for manufacturing or controlling a technical system, the method comprising:
   (a) inputting a sample of parameter sets suitable for manufacturing or controlling the technical system, with a feasibility identifier assigned to each of the parameter sets, wherein the feasibility identifier marks each parameter set either as technically feasible, if the parameter set meets given system criteria of the technical system, or technically non-feasible, if the parameter set does not meet the given system criteria, or erroneous, if an evaluation of the parameter set using a computerized simulation results in an error, in terms of manufacturing or controlling the technical system;

(b) generating a computerized surrogate model for the technical system based on the respective parameter sets of the sample, which are marked as technically feasible, but not on erroneous and not on non-feasible parameter sets, by means of a regression method;

(c) determining an optimized parameter set based on the surrogate model by means of a computerized optimization method; and (d) outputting the optimized parameter set for manufacturing or controlling the technical system.

2. The computer-implemented method according to claim 1, wherein a feasibility identifier of the optimized parameter set is determined by means of a computerized evaluation method.

3. The computer-implemented method according to claim 1, wherein the optimized parameter set is determined by means of the computerized optimization method and depending on the feasibility identifier of the optimized parameter set.

4. The computer-implemented method according to claim 1, wherein the optimized parameter set is added to the sample of parameter sets and the method steps (b) to (d) are repeated.

5. The computer-implemented method according to claim 1, wherein the inputted sample of parameter sets is generated and outputted by means of a second computerized optimization method which is configured to determine at least one parameter set suitable for manufacturing or controlling the technical system.

6. The computer-implemented method according to claim 1, wherein the regression method is an incremental local Gaussian regression method.

7. The computer-implemented method according to claim 1, wherein the technical system is manufactured or controlled using the outputted optimized parameter set.

8. An apparatus for manufacturing or controlling a technical system, the system comprising:

(a) an input unit configured to input a sample of parameter sets suitable for manufacturing or controlling the technical system, with a feasibility identifier assigned to each of the parameter sets, wherein the feasibility identifier marks each parameter set either as technically feasible, if the parameter set meets given system criteria of the technical system, or technically non-feasible, if the parameter set does not meet the given system criteria, or erroneous, if an evaluation of the parameter set using a computerized simulation results in an error, in terms manufacturing or controlling the technical system;

(b) a generator configured to generate a computerized surrogate model for the technical system based on the parameter sets, which are marked as technically feasible, but not on erroneous and not on non-feasible parameter sets, by means of a regression method;

(c) an optimizer configured to determine an optimized parameter set based on the generated surrogate model by means of a computerized optimization method; and (d) an output unit configured to output the optimized parameter set for manufacturing or controlling the technical system.

9. The apparatus according to claim 8 comprising a manufacturing unit configured to manufacture the technical system using the outputted optimized parameter set.

10. The apparatus according to claim 8 comprising a control unit configured to control the technical system using the outputted optimized parameter set.

11. A computer program product, comprising a computer readable hardware storage device having computer readable program code stored therein, said program code executable by a processor of a computer system to implement a method of claim 1 when the computer program product is run on a computer.

* * * * *